United States Patent
Narang

[11] Patent Number: 6,146,716
[45] Date of Patent: *Nov. 14, 2000

[54] CONSERVATIVELY PRINTED DISPLAYS AND METHODS RELATING TO SAME

[75] Inventor: Subhash Narang, Palo Alto, Calif.

[73] Assignee: SRI International, Menlo Park, Calif.

[*] Notice: This patent is subject to a terminal disclaimer.

[21] Appl. No.: 09/305,152

[22] Filed: May 4, 1999

Related U.S. Application Data

[62] Continuation-in-part of application No. 09/105,858, Jun. 26, 1998, Pat. No. 5,980,813, and a continuation-in-part of application No. 09/226,558, Jan. 5, 1999, which is a continuation-in-part of application No. 09/149,880, filed as application No. PCT/US98/25088, Nov. 24, 1998.
[60] Provisional application No. 60/097,706, Aug. 21, 1998.

[51] Int. Cl.[7] .................................................. G02F 1/00
[52] U.S. Cl. ....................... 427/559; 427/558; 427/96; 427/98; 427/261; 427/287; 430/315; 430/324
[58] Field of Search .................................. 427/261, 283, 427/287, 96, 98, 558, 559; 430/315, 324

[56] References Cited

U.S. PATENT DOCUMENTS

| | | | |
|---|---|---|---|
| 3,994,727 | 11/1976 | Polichette et al. | 427/261 |
| 5,444,557 | 8/1995 | Spitzer et al. | 359/59 |
| 5,468,597 | 11/1995 | Calabrese et al. | 430/315 |
| 5,548,055 | 8/1996 | Narang et al. | 528/25 |
| 5,636,072 | 6/1997 | Shibata et al. | 359/896 |
| 5,980,998 | 11/1999 | Sharma et al. | 427/559 |

*Primary Examiner*—Shrive Beck
*Assistant Examiner*—Kirsten A. Crockford
*Attorney, Agent, or Firm*—Robert D. Fish; Fish & Associates, LLP

[57] ABSTRACT

Display elements of computer screens and other information displays are printed using conservative printing techniques. Contemplated electronic components that can be conservatively printed at the display element level include switches, transistors, capacitors, memory elements, and actuators. Contemplated light path components that can be conservatively printed at the display element level include light pipes or other optical wave guides, mirrors, light emitting diodes, liquid crystals, and actuators. The conservatively printed components may advantageously be produced by a process that includes depositing a precursor onto the substrate in a desired pattern, depositing an appropriate ligand onto the substrate, and applying sufficient energy to transfer electrons from the ligand to the precursor, thereby decomposing the precursor to form a precipitate. In an especially preferred class of embodiments, light emission at individual display elements is controlled by a conservatively printed moving actuator. The teachings herein may advantageously be employed in very large displays (measuring more than a meter across), including larger televisions such as "hang-on-the-wall" televisions, billboards, custom advertising, and presentation displays. The teachings herein may also advantageously be employed in flexible displays, such as those printed on fabrics utilized in clothing, or wrapped about a curved surface.

16 Claims, 3 Drawing Sheets

CONSERVATIVELY PRINTED DISPLAYS AND METHODS RELATING TO SAME

This application is a continuation-in-part of allowed U.S. application Ser. No. 09/105,858, filed on Jun. 26, 1998, now U.S. Pat. No. 5,980,813, and International Application No. PCT/US98/25088, filed Nov. 24, 1998, which claims the benefit of U.S. Provisional Application No. 60/097,706, filed on Aug. 21, 1998, and U.S. application Ser. No. 09/226,558 filed on Jan. 5, 1999, which is a CIP of U.S. application Ser. No. 09/149,880 filed on Sep. 8, 1998, each of which is incorporated herein by reference in its entirety.

FIELD OF THE INVENTION

The field of the invention is information displays.

BACKGROUND OF THE INVENTION

Computer and other information displays have been known for many years, and are presently incorporated into seemingly innumerable products, from consumer electronics to automobiles. While all such displays serve to visually communicate information, they can vary considerably in the complexity and cost of fabrication. Three areas that greatly affect fabrication techniques are pixel addressing techniques, type and complexity of pixel structure, and size of the display.

Pixel Addressing Techniques

The term "information display" is used herein to mean a device capable of dynamically displaying information as a pattern of addressable display elements, generally with the capacity to change images at least several times a second. At its most basic level, an information display (hereinafter at times simply "display") requires some means of emitting light in distinctly addressable areas known as pixels. The simplest case involves only a single pixel, such as that found in an on-off indicator. In such instances addressing the pixel is trivial, and is usually done by completing an electric circuit through a light emitting diode (LED), a small light bulb, or some other discreet light source. In displays having many more pixels, discreet light sources may still be used, but addressing such sources becomes problematic. Nevertheless, very large and very complicated displays using self-contained, discreet light sources are known, and examples can be seen in the marquis of some buildings, and entertainment displays used in various athletic stadiums.

In many applications, however, there is a continuing desire for increased display resolution that does not employ discreet display elements. There is also a continuing desire for larger displays, and this combination implies employing ever larger numbers of pixels, configured ever closer together, and consequently ever increased difficulties in addressing the pixels.

One solution is to scan the pixels using an energy beam. In cathode ray tubes (CRTs), for example, an electron beam is produced distally from the pixels, and is then aimed at individual pixels using electromagnets. The display elements corresponding to the pixels are merely passive phosphors that emit light when struck with electrons from the beam. While very high resolution can be achieved using electron beam addressing, the known techniques involve relatively high energy and production costs. Among other things, electron beams tend to travel well only through a vacuum, and therefore large displays require large vacuum tubes. Such tubes tend to be extremely expensive, and relatively fragile. It is possible to use coherent energy beams (lasers) to avoid the necessity of vacuum tubes while still addressing individual pixels, but such displays presently suffer from considerable technical hurdles.

The modem trend is to utilize display elements having active components, whether light producing or merely light modulating. The active display elements are then addressed according to one or another scanning technique. Direct addressing is arguably the simplest form of addressing active display elements. Where voltages are employed to effect the addressing, each display element is activated by applying a voltage to a corresponding row and column. Although direct addressing is conceptually simple, it can be difficult to implement because a matrix of x rows and y columns requires a total of x times y electrodes. This problem is resolved to some extent by multiplex addressing, in which an entire matrix is scanned on a row-by-row basis, with additive or subtractive signals carried concurrently by the various columns. Multiplex addressing allows a matrix of x rows and y columns to be addressed using a total of x plus y electrodes.

Active matrix addressing is a further improvement, in which each display element is addressed by a semiconductor switch. Thin film transistors (TFTs) are often employed as the semiconductor switches, although thin film diodes have been used in some displays. Typically, each of the TFTs has one terminal connected to a row-addressing electrode, one terminal to a column-addressing electrode, and the third terminal to a capacitor. When a pulse is applied to a row, all of the TFTs in that row are turned on, and the gray level at each display element can be controlled by a voltage applied to the corresponding column electrode. The capacitor substantially reduces relaxation or other effects resulting from the time delay between scan cycles.

Since techniques for addressing active display elements require grid connections at each display element, such techniques can be extremely difficult to implement from a manufacturing standpoint. The manufacturing difficulties are complicated in active matrix addressing because transistors and capacitors must also be fabricated, and coupled to both grid lines and the light producing or modulating components at each display element.

Complexity Of Display Element Structure

Manufacturing difficulties are further complicated to the extent that display technologies involve complicated structures at each display element. For example, U.S. Pat. No. 5,636,072 to Shibata et al., which is incorporated herein in its entirety, describes a complicated display that employs piezoelectric film actuators at each display element to direct light through a screen. The patent states that individual layers for such display elements can be formed using microlithography processes, but the final production is not at all simple. At various stages, fabrication involves sintering at more than 1000° C., and removing unnecessary material using laser machining, slicing, and ultrasonication.

An even more complicated display employs a miniature tiltable mirror at each display element to redirect light. (See *Digital Light Processing™ and MEMS: Reflecting the digital display needs of the networked society* by Larry J. Hornbeck, SPIE/EOS European Symposium on Lasers, Optics, and Vision for Productivity in Manufacturing I, Besancon, France (Jun. 10–14, 1996), which is incorporated herein in its entirety). In Hornbeck, the entire device is fabricated as a superstructure on top of a CMOS memory circuit, using IC photolithography and micromachining.

Size Of The Display

All of these manufacturing difficulties are still further exacerbated as displays become larger. For example, in active matrix liquid crystal displays (AMLCD), both the display element level TFTs and their corresponding driver circuits can be fabricated on single crystal silicon (x:Si) using microlithography, but the components must then be removed from the manufacturing substrate and bonded to a display substrate such as glass or plastic. In addition, the use of x:Si limits the practical display size to only a few inches. It is known in larger displays to employ amorphous silicon (a:Si) in fabricating the thin film transistors at the display elements, but amorphous silicon is too slow to produce the driver circuitry. In theory, polycrystalline silicon (p:Si) can be employed for both display element TFTs and driver circuits, but production difficulties have largely limited the use of polycrystalline silicon to displays measuring a few inches. All of these limitations can be stretched, but at a relatively high cost. Thus, the commonly employed techniques of microlithography, sputtering, vacuum deposition, and so forth, may be well suited for depositing metallic traces on a circuit board, and for printing electronic chips, but are poorly suited for printing components of larger displays.

Processes are known for producing transistors, circuits, and other electronic devices by techniques other than microlithography, and in principle such processes could be employed to produce large displays. U.S. Pat. No. 4,614,837 to Kane et al. (September, 1986), U.S. Pat. No. 5,576,074 to Weigel et al. (November, 1996), and U.S. Pat. No. 5,378,508 to Castro (January, 1993), for example, all describe additive deposition processes in which a surface is coated with a substance, energy is transferred to the coating in a desired pattern, and then excess coating substance is washed away to leave the desired pattern. But all such processes are also partially subtractive in that a substantial portion of the deposited material must be removed to produce the final product. Depending on the particular embodiments, at least 5%, 10%, 20%, 30%, or even more than 50% of the deposited material must be removed. Thus, even these methods are inherently problematic when applied to complex, multilayer structures such as may be employed in fabricating displays.

Operating Characteristics

In military and other applications it is also sometimes desirable to provide relatively large displays (e.g., $\geq 20 \text{ cm}^2$) that are lightweight (e.g., $\leq 0.5$ kg), ruggedized sufficiently to be employed in tanks, automobiles and other vehicles subject to considerable vibrational and translational shock, can be utilized at night without a backlight, are sufficiently flexible to be rolled or folded, and are relatively inexpensive (e.g., $\leq 1.00/\text{cm}^2$). None of the present known displays satisfies these requirements. Current active matrix liquid crystal displays (AMLCD) require backlighting to be seen at night, and indeed are very difficult to see in broad daylight. Active matrix electroluminescent displays (AMEL) meet some of these requirements, but are limited to small sizes, and are relatively expensive. Plasma and field emission displays (FED) are typically less than 2 lumens/watt (1 m/W), and due to the need for a high vacuum cannot easily be made flexible.

Conservative Printing Techniques

Conservatively printed displays are potentially able to satisfy these various requirements, but have not previously been enabled. As used herein, the term "conservative printing" means printing in which either (a) materials are laid down in substantially a desired format, without requiring substantial etching or other removal of unwanted material, or (b) the printing can be effectively utilized outside of a high-vacuum, ultra-pure environment. Examples are offset printing in general, ink jet printing, stamping, and intaglio printing. Of course, newspapers, books, magazines, posters, billboards, and the like have all been printed for many years using conservative printing techniques. But these items are not considered to comprise information displays as the term is utilized herein, because such presentations are essentially static.

As defined above, information displays must have a dynamic response capability. At least with current technology this requires some sort of driver circuit, which in turn requires some sort of electronic components and circuitry. In that context, conservative printing of displays necessarily involves deposition of metals, metal oxides, insulators, and other layers of circuits or electronic components in substantially the desired format, without requiring substantial etching or other removal of unwanted material.

It is known to employ conservative printing techniques to produce very simple electronic circuits. For example, U.S. Pat. No. 4,702,563 to Parker (October 1987) describes conservative printing of battery testers. U.S. Pat. No. 5,055,968 to Nishi et al., (October 1991) describes conservative printing of a circuit for an information card, which receives an IC to become operable. U.S. Pat. No. 5,688,146 to McGliney et al. (November 1997) describes conservative printing of the traces that form a liquid crystal display grid using solderable inks. U.S. Pat. No. 5,468,597 to Calabrese, et al. (November 1995) describes a potentially conservative printing technique having broad utility, in which a metal precursor and ligand are applied to substrate in a desired pattern, and energy is subsequently applied in the same pattern to transfer electrons from the ligand to the precursor. In such manner metal traces can be conservatively printed in the desired pattern. But none of these patents teaches or suggests, let alone enables, conservative printing of the display elements of displays, where such elements include an electronic component such as a transistor or capacitor.

My copending U.S. patent application Ser. No. 09/226558, as well as my copending international application, PCT/US98/25088, each of which are incorporated herein in its entirety, disclose conservative printing techniques for fabricating circuits, batteries, and electronic components. But those disclosures did not explicitly detail how such techniques can be employed to conservatively print entire information displays.

Thus, there is a continuing need to develop conservatively printed displays, especially large or flexible displays, and more especially displays that also meet other desirable operating characteristics.

SUMMARY OF THE INVENTION

The present invention is directed to conservative printing of display elements of information displays. Contemplated electronic components that can be conservatively printed at the display element level include switches, transistors, capacitors, memory elements, and actuators. Contemplated light path components that can be conservatively printed at the display element level include light pipes or other optical wave guides, mirrors, light emitting diodes, liquid crystals, and actuators.

In one aspect of preferred embodiments the displays utilize some form of active matrix addressing, in which the electronic components at the individual display elements are conservatively printed, and more preferably conservatively printed in a non-vacuum environment. In another aspect of preferred embodiments, the conservatively printed components are produced by a process that includes depositing a precursor onto the substrate in a desired pattern, depositing an appropriate ligand onto the substrate, and applying sufficient energy to transfer electrons from the ligand to the precursor, thereby decomposing the precursor to form a precipitate.

In an especially preferred class of embodiments, light emission at individual display elements is controlled by a conservatively printed moving actuator. Preferred actuators include piezoelectric materials, and light for such displays may be provided either from the side, as by a light pipe assembly, or from the back of the display, as from a fluorescent lamp. In other embodiments, light emission at individual display elements is controlled without the use of a physically moving actuator. Contemplated displays include liquid crystal, LED, and electroluminescent displays.

The teachings herein may advantageously be employed in very large displays (measuring more than a meter across), including larger televisions such as "hang-on-the-wall" televisions, billboards, custom advertising, and presentation displays. The teachings herein may also advantageously be employed in flexible displays, such as those printed on fabrics utilized in clothing, or wrapped about a curved surface.

Various objects, features, aspects and advantages of the present invention will become more apparent from the following detailed description of preferred embodiments of the invention, along with the accompanying drawings in which like numerals represent like components.

DETAILED DESCRIPTION

Pivoting Element Actuated Display

Figure 1:
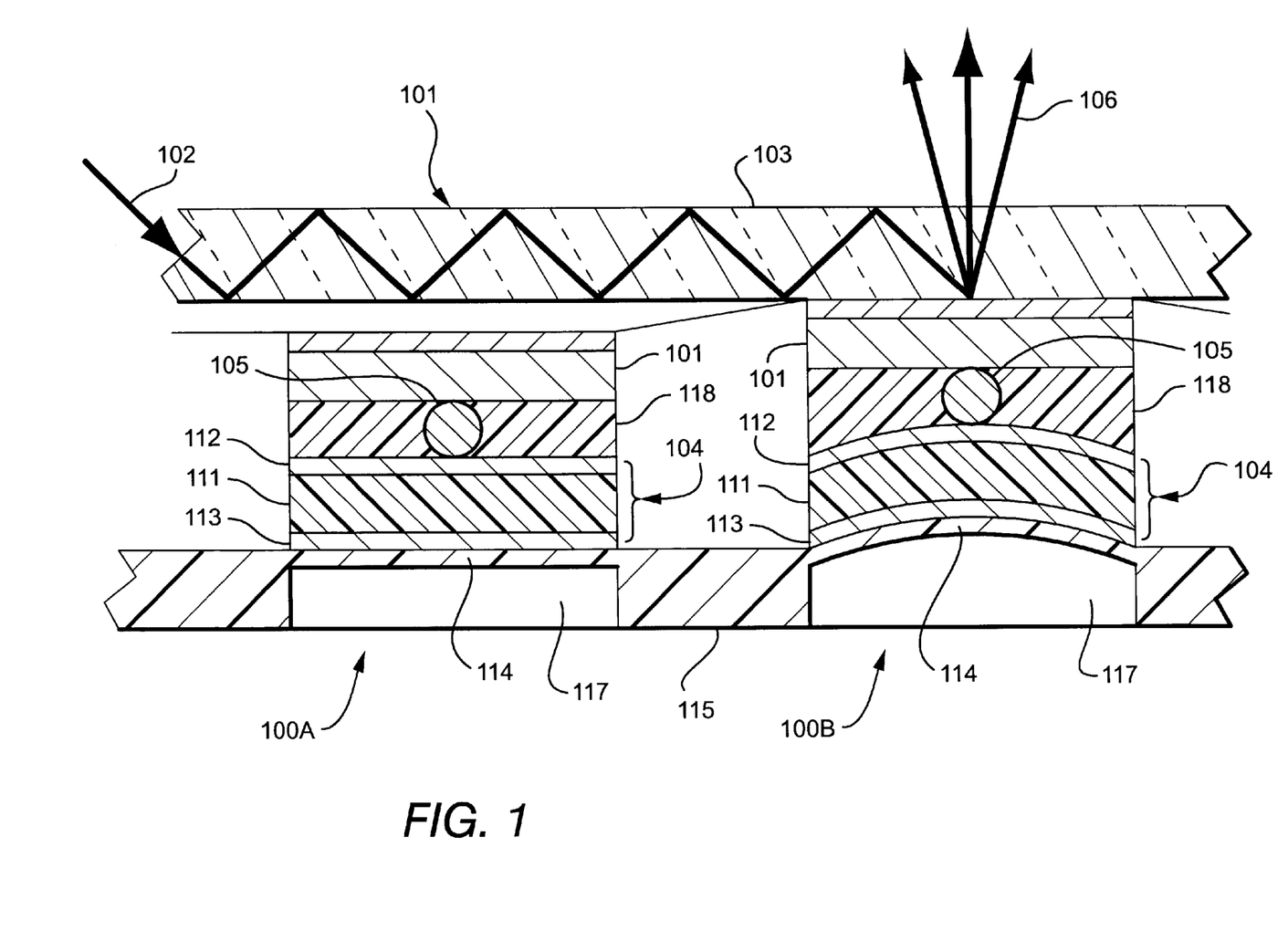
FIG. 1 is a schematic of an actuator display element employed in a display according to the inventive subject matter.

In FIG. 1, two display elements 100A and 100B are generally configured with respect to a plate 101 in accordance with the teachings of U.S. Pat. No. 5,774,257 to Shibata et al. (June 1998), which is incorporated herein by reference. The left display element 100A is in a rest condition, and the right display element 100B is in an excited condition. In general, light enters the plate 101 from the side, and bounces back and forth within the plate as shown by rays 102, until it is either absorbed, or reflected outwards through the plate surface 103 in the direction of rays 106 as a result of a displacement-transmitting portion 105 contacting plate 101. Movement of portion 105 is produced by movement of actuator 104 relative to fixed portion 115. In this manner the each of the display elements 100A, 100B each control light emitted at a single corresponding pixel.

As further described in the Shibata reference, actuator 104 includes a piezoelectric film 111 preferably made of ceramic, and a pair of electrodes 112 and 113 covering opposing surfaces of the piezoelectric film. The electrodes 112, 113 are preferably coupled to driver circuitry (not shown) through a matrix of rows and column conductors (not shown), and may optionally be coupled to additional electronic components (not shown) as part of an active matrix control. What are depicted as micromachined cavities or areas in the Shibata reference (e.g., elements referenced by numerals 17) may advantageously be replaced in the presently contemplated embodiments by sacrificial materials 117 that provide support for structures built thereon, but are removed during subsequent processing. Alternatively, supporting materials (such as material 118 surrounding the displacement-transmitting portion 105) may advantageously comprise a very soft polymer, having sufficient compressive strength to support a superior layer during manufacture, but having sufficient flexibility that the supporting material does not interfere with movement of the actuator 104 or other movable components. Sacrificing of sacrificial material 117 yields movable portion 114.

In general, operation of the display elements, including production of colors, is contemplated to occur substantially as described in the Shibata reference. For example, color filters can be utilized in one or more of the light paths. Red, blue, and green (RBG) filters can be utilized for wide color range, or the three primary colors can be used.

The display elements 100A, 100B can be fabricated substantially in accordance with methods already described in one or more of the priority applications. For example, the conductors, including the various row and column traces (not shown), as well as electrodes 112 and 113 and connecting traces to such electrodes, can all be printed substantially as set forth in Example 1 of PCT/US98/25088. In general, copper (II) formate can be mixed with cyclohexylamine or other nitrogen donor molecules, printed on a plastic substrate such as Kapton™, Kevlar™, or Teflon™ using an ink-jet type printer, and then pyrolyzed to yield substantially pure copper traces. Microwaves are a preferred energy source because they are relatively easy to produce and control, but other energy sources are contemplated, including hot air guns, hot wire and other radiative infrared sources, and even electron beams and lasers.

Sacrificial material 117, as well as displacement-transmitting portion 105, material used to separate closely spaced conductors, and other materials needed to provide support for overlying structures, can all be printed substantially as set forth in Example 2 of PCT/US98/25088. In general, a binder and polyvinylidene flouride (PVDF) can be dissolved in n-methyl-pyrrolidone (NMP), heated to ensure the PVDF dissolves fully, and then supplemented with aluminum oxide powder. After being mixed for 12 hours, and viscosity adjusted using NMP, the mixture can be printed using an ink-jet type printer, and cured using an appropriate energy source such a microwave generator or a hot air blower.

As discussed in the Shibata patent, both the movable portion 114 and the fixed portion 115 may comprise stabilized zirconia, a mixed metal oxide containing 1–30% by mole of calcium oxide, magnesium oxide, yttrium oxide, scandium oxide, ytterbium oxide, cerium oxide, or a stabilizer such as rare earth metal oxide. Stabilized zirconia can be printed as set forth in PCT/US98/13366, by preparing an aqueous mixture of the various metal nitrates with acrylic acid or other unsaturated carboxylic acids, depositing the mixture by ink-jet type printer, and then curing using an appropriate energy source to yield the mixed metal oxide free from organics. The relative amounts of the metal nitrates and the carboxylic acids can be adjusted to effect a complete oxidation of the organics.

It is preferred, however, to use an ionomeric polymer in place of a piezoelectric material. Both types of materials have the requisite frequency response, but ionomeric polymers tend to respond at lower voltages, thus consuming less energy and enabling battery powered operation without the need for a transformer. This can be an advantageous, especially in fabricating large displays. Preferred ionomeric polymers, as well as methods for producing such polymers, are described in U.S. Pat. No. 5,548,055 to Narang. While not specifically described as ionomeric polymers in that patent, the disclosed polymers carry a charge, and can be flexed or otherwise moved by applying a voltage to a thin piece of such polymers. As with the other materials employed in producing the display elements 100A, 100B, ionomeric polymers can be printed using an ink-jet type printer, and cured by application of microwaves, hot air blower, or other heat energy source.

The plate 101 may be added on top of the display elements 100A, 100B as contemplated in Shibata. It is also possible to print the plate 101 on top of the display elements 100A, 100B. A preferred material for printing plate 101 is indium tin oxide. Indium tin oxide is a relatively transparent light conductor, which can be used as a top layer for liquid crystal and light emitting diode display elements. There is a potential problem in preventing the printed plate from adhering to the displacement-transmitting portions 105, but this can be avoided by sufficiently curing previous layers prior to applying subsequent layers. Suitable materials for plate 101 include clear, flexible polymers.

Those skilled in the art will appreciate that the actuator of FIG. 1 is merely an example of display elements and display types that can be fabricated using the concepts discussed herein. Among other things, the light source in FIG. 1 was produced laterally to the plane of display elements. There are other options for using laterally provided light sources. Alternatively, actuated display elements can be employed to control light generated locally at individual pixels. In still other embodiments, actuated display elements can be employed to control light passing through a display element from behind. An example of this latter class of embodiments is discussed below with respect to FIG. 2.

Movable Mirror Actuated Display

Figure 2:
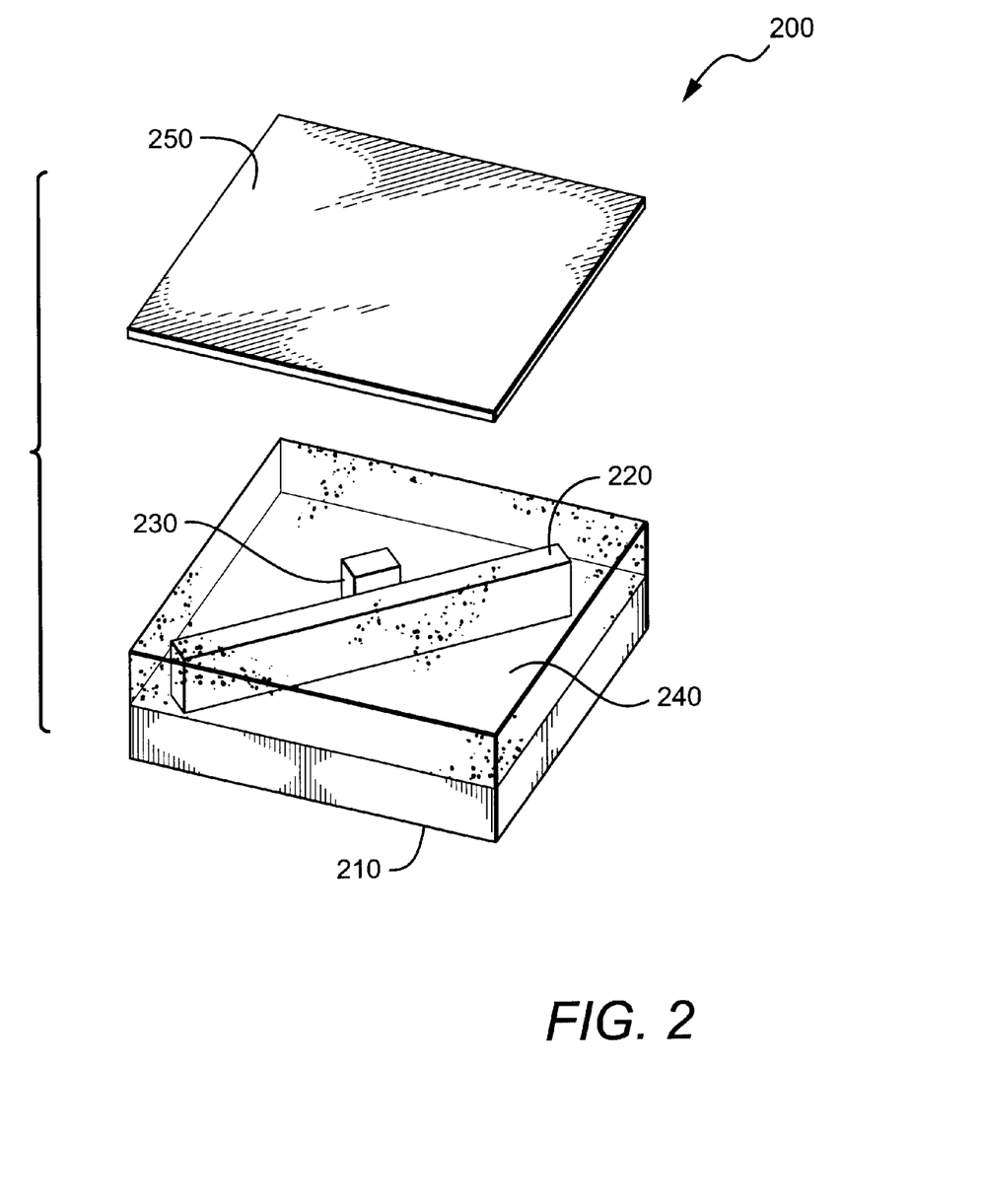
FIG. 2 is a schematic view of a partially exploded mirror actuated display element in another display according to the inventive subject matter.

In FIG. 2 a display element 200 generally comprises a base 210, a rocker 220, an ionomeric polymer actuator 230, filler material 240 and a mirror 250. These components are intended to correspond roughly to the various components described in the Hornbeck article referred to above, and to operate in roughly the same manner. For example, the base 210 corresponds to Hornbeck's CMOS substrate, and may indeed comprise a memory module, transistor or other logic related to the addressing or other operation of the display element 200. Similarly, the rocker 220 and actuator are intended to cooperate together in a manner having similar effect to that of Hornbeck's yoke, hinge, and landing tip. The filler material 240 does not have a direct equivalent in Hornbeck per se, and corresponds instead to the various spaces in Hornbeck that are produced by etching away of sacrificial material. Of course, the mirror 250 corresponds with, and is intended to operate in a manner similar to that of Hornbeck's mirror.

Some of the main differences, however, relate to methods of fabrication. In Hornbeck, the entire display element is laid down using microlithography techniques commonly employed with respect to production of silicon based chips in which voids (i.e., air gaps) used to separate and define the various components are fabricated by plasma etching or other subtractive techniques. In the present teachings, the entire display element 200 can be laid down in accordance with the various conservative printing teachings of PCT/US98/25088. For example, conductive traces and electrodes, as well as mirrors can be printed as pure form metals in accordance with the teachings related to PCT/US98/25088, Example 1. Any insulators and filler can be printed materials as described with respect to dielectric materials in accordance with the teachings related to PCT/US98/25088 Examples 2 & 3, and any semiconductor materials can be printed in accordance with the teachings related to PCT/US98/25088 FIG. 4. Preferred printing techniques include ink-jet type printing, as well as microstamping, and web based lithography. Energy required for pyrolysis steps can advantageously be provided by any suitable energy source, including microwave antennae, hot air guns, hot wire and other radiative infrared sources, electron beams and lasers.

Preferably, these conservative printing techniques do not require a high vacuum for production. As used herein the term "high vacuum" refers to a pressure of less than 1 mm Hg.

With respect to particular components, the base 210 may advantageously comprise a CMOS memory cell 210 substantially as described in the Hornbeck article referenced above. Although such a configuration is preferable because it provides active addressing to the display element 200, it is also contemplated that passive addressing is used instead, in which case the base can merely comprise a support, and provide for relatively simple interconnection of row and column traces (not shown) with interlayer conductors (not shown) that provide a suitable electrical potential across actuator 230.

The rocker 220 is preferably somewhat rectangular in cross-section and elongated in a perpendicular plane. Other shapes are contemplated, however, so long as the rocker 220 can cooperate with one or more movers to effect movement of the mirror 250. Among the many shapes contemplated is a rocker that is somewhat triangular in cross-section, with the "apex" being flattened where it joins the bottom of the mirror 250. The top of rocker 220 is preferably fabricated from the same material as, and substantially continuous with, the lower portion of mirror 250.

The ionomeric actuator 230 is contemplated to be used in moving mirror 250 relative to base 210. To that end actuator 230 will likely be controlled by two address electrodes (not shown) coupled to a transistor (not shown) or other electronic component within base 210 using interlevel conductors (not shown). Such interlevel connections can be made in accordance with the teachings of PCT/US98/25088, and are exemplified with respect to a different type of component in FIGS. 2–5, 6B, and 7–8 of that application.

Surrounding the rocker 220 and ionomeric actuator 230 is a dielectric filler material 240. The filler material 240 preferably has a very porous, spongy characteristic, and is deposited mostly as a fabrication support for mirror 250. Suitable filler materials 240 include polysiloxanes, polyurethanes, and other low modulus rubbers. Although some or all of the filler material 240 could be removed by solvation, or various other subtractive steps, it is preferred that the filler material 230 is left in place to bias the mirror 250 in a rest position.

The mirror 250 is contemplated to comprise a supportive lower portion that is substantially continuous with the top of the rocker 220, and a top portion that is highly reflective. Suitable reflective materials include metals such as aluminum. Such mirrors can be readily printed using the techniques of PCT/US98/25088, as for example by printing silver, aluminum or copper in accordance with the general outlines given in Example 1 and FIG. 1 of that application. Mirrors 250 may have any practical size and shape, including the 16 µm square dimensions taught by Hornbeck, and may have movement of +/−10° as described in Hornbeck.

Preferred operation of display element 200 is also contemplated to be substantially similar to that described in the Hornbeck article. For example, grayscale of displays employing display elements 200 can be achieved using binary pulse width modulation. Similarly, light sources are contemplated to be similar to that described in Hornbeck, including the use of such display elements with resect to single and multiple chip projection technologies.

Electroluminescent Display

Figure 3:
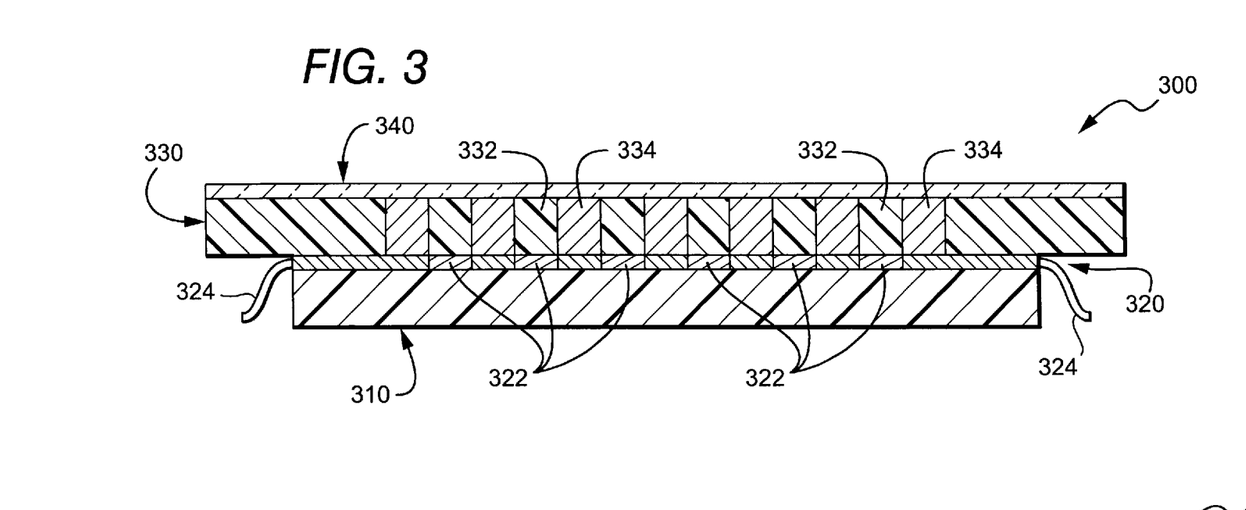
FIG. 3 is a schematic of a cross section of a light pipe display according to the inventive subject matter.

In FIG. 3, a display 300 generally comprises a substrate 310, a light producing layer 320 containing electroluminescent dots 322 and electrical conductors 324, a light modulating layer 330 having spaced apart light conducting pipes 332 and light opaque regions 334, and a protective cover 340.

In general, the various components of FIG. 3 correspond in function to the various components of the electroluminescent light pipe display described with respect to FIGS. 5–7 in U.S. Pat. No. 4,378,956 to Lester (April 1983), which is incorporated herein by reference. The main difference is that in this case most, or indeed all, of the components can be printed using conservative printing techniques, substantially in accordance with the teachings of PCT/US98/25088.

The substrate 310 can be any material that receives a superior layer. The choice of substrate material will largely depend upon material costs, processing costs, and special requirements. For example, glass may be employed, but glass cannot realistically be moved through high speed printing since it tends to shatter, and has only very limited flexibility. Paper may also be used, or some form of cloth, but these materials would tend to degrade too easily. At present, preferred substrate layers comprise a plastic sheeted material such as Kapton™, Kevlar™, or Teflon™.

Light producing layer 320 is preferably also a plastic, but in this instance the conductors, the insulators between the traces, and the electroluminescent dots are all printed on the plastic. The electroluminescent dots 322 are preferably fabricated from aluminum quinolates, rare earth chelates and conducting polymers, and generate visible light using voltages of less than about 10V, and more preferably less than about 2 V. Light producing layer 320 can be printed directly on top of the substrate 310, or can be attached to substrate 310 using an adhesive. Of course, it should be appreciated that the electrical conductors 324 are laid out in a matrix pattern as traces, using insulators where appropriate, as well as suitable connections to the electroluminescent dots. Also, it should be appreciated that the dimensions of the individual electroluminescent dots 322, and the spacing between such dots (if any), will largely determine the resolution of the display. For laptop computers, desirable resolution is in excess of 60 dots per inch.

Light modulating layer 330 is preferably printed directly on light producing layer. In most displays light modulating layer 330 will have a matrix of thousands, or more likely millions of alternating light conducting pipes 332 and light opaque regions 334. Materials suitable for light conducting pipes in general are known, and in this case may advantageously comprise acrylic fibers. The light opaque regions 334 are also preferably a polymer, and may advantageously comprise carbon filled polyacrylates or carbon filled polyurethanes. Materials for both light conducting pipes 332 and light opaque regions 334 can be readily deposited in an uncured form using an ink-jet type or lithographic printer, and curing using an appropriate light source.

Protective cover 340 can again advantageously comprise a clear plastic or glass, and can either be printed or affixed as a separate component. Protective cover may also include on one of its sides a thin polarizer (not shown), which again can either be printed or bonded.

Color may be imparted to the display either by selecting electroluminescent dot materials that produce light in desired colors at different pixels, or by including various colorants in the light pipe materials at different pixels, by including a colorant in pixels in the protective cover 340, or in some combination of these. As is well known in the art, what is viewed as a single pixel area may actually comprise individual pixels of various primary colors, and the combination of light being emitted in various primary colors mixes to comprise a substantially continuous color palette.

Light Pipes

Figure 4:
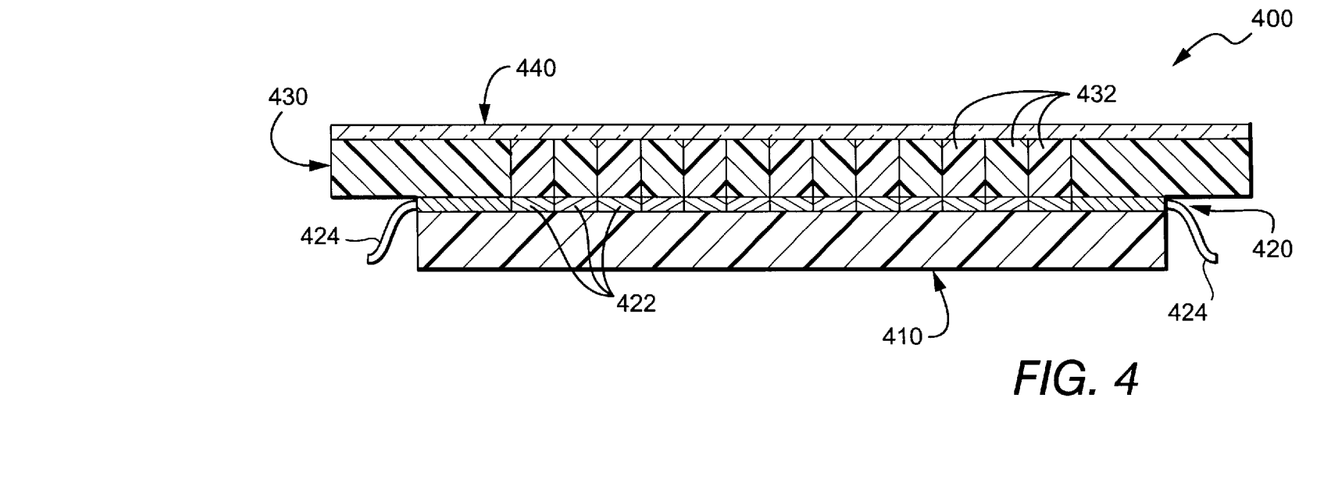
FIG. 4 is a schematic of a conservatively printable liquid crystal display.

In FIG. 4 a display 400 generally comprises a light source 410, a light modulating layer 420 that includes liquid crystals 422 and electrical conductors 424, a light conducting layer 430 having light conducting pipes 432, and a protective cover 440.

The display is similar in many respects to that described with respect to FIGS. 1–4 in U.S. Pat. No. 4,378,956 to Lester (April 1983). For example, the liquid crystal 422 in light modulating layer 420 can substantially be the same as the liquid crystals contemplated to be employed in Lester. Once again, however, a major difference is that many or all of the components can be conservatively printed.

Display 400 is also quite similar to display 300 in FIG. 3 described herein above, and similar aspects will not be restated. One main difference, however, is that in FIG. 4, the light is not supplied locally, but supplied from a distance through light source 410, and the amount of light passing out of each pixel is controlled by polarization of liquid crystal 422 under the influence of voltage supplied by electrical conductors 424. Light source 410 may be any suitable light source, including the back lighting light sources commonly employed with respect to liquid crystal displays. Light source 410 may also itself comprise a large light pipe, conducting light from a light bulb lateral to the display. Suitable light pipe material for this purpose includes acrylic fibers such as those used in Sumitomo™ 3M™ Light Fiber.

Another difference is that the display 400 is depicted as having no opaque regions interposed between light pipes 432. This same arrangement is possible with respect to the display 300 of FIG. 3, and the two versions of FIGS. 3 and 4 are shown here to exemplify the two possibilities. Still another difference is that the display 400 is depicted as having no backing that corresponds with substrate 310 of FIG. 300. Here again, this is optional, and the two versions of FIGS. 3 and 4 are shown here to exemplify the two possibilities.

Many other light pipe type displays are also contemplated. For example, conservative printing techniques as discussed in the PCT/US98/25088 application can be employed to substantially duplicate the type of display elements described in U.S. Pat. No. 5,760,754 to Amero et al. (June 1998), which is incorporated herein by reference.

Moreover, all suitable light sources are contemplated herein. In some instances the light can advantageously be generated local to the display element, and by way of example it is contemplated to conservatively print light emitting diodes or electroluminescent devices at the display element level. Preferred local light sources are organic light emitting devices such as those described in U.S. Pat. No. 5,707,745 to Forrest et al. (January 1998).

It is also contemplated for light used in a display to be generated distally from the display elements. Distally produced light may be provided by near white light sources such as fluorescent or incandescent lamps, and colored light sources such as lasers.

Integrated Components

It is especially contemplated that electronic components associated with displays described herein may be integrated with the displays, and printed in similar manner. Thus, a conservatively printed display may advantageously be integrated with a conservatively printed battery, driver circuit, or both. Lithium polymer batteries are preferred, and such batteries can be manufactured as set forth in PCT/US98/25088. Many circuits are known that can be adapted to conservative printing techniques, again as set forth in PCT/US98/25088. Preferred driver circuits are bitable, meaning that they can hold information for extended periods with no power input.

Printing Methods In General

Of course, all of the printed compositions discussed can advantageously be prepared well in advance, and printed in a time and materials efficient time sequence. Thus, although a single ink-jet type print head can be employed by swapping out multiple reservoirs, it is preferred to employ multiple print heads using multiple reservoirs. Among other things this allows each head to be optimized for the needed resolution, with resolutions down to 10 $\mu$m, and even 5 $\mu$m being possible with present ink-jet printing devices, and further improvements being contemplated. Still further, CAD/CAM can be used to control the application of the layers, allowing both excellent control of the printing devices, and highly flexible system design.

For somewhat larger runs, such printers may be operated in conjunction with an XYZ production table, such as that described in U.S. Pat. No. 4,981,074 to Machita et al. (January 1991). In general such devices provide high accuracy and resolution over any type of substrate with computer-control over the x-y plane, while allowing fabrication of 3-D structures by multilayer deposition. An especially preferred category of printing devices includes CAM type direct writing systems, such as an Ohmcraft, Inc. Micropen 400. In that device, the pen, table and material pumping system are under direct, interactive, synchronous computer control at all times, and each of the variables, (writing speed, pumping rate, pen force, deposit thickness, deposit width, column per unit length and column per unit time), may be individually programmed. The solution being deposited is pumped to the pen tip, and can be deposited in pulses of about $2.7 \times 10^{-7}$ ml. The pen rides on the surface of the solution being extruded, and need not touch the substrate during writing. This permits all contours of the substrate to be followed, while providing constant thickness if desired. Fine line patterns can be produced at 4 mil or less, with 5% tolerance.

By employing continuous substrate, such as may be drawn from a roll of metal foil or paper, it is also possible to print a large number of identical circuits at high speeds of tens of meters or more per minute. Such circuits can then be separated from one another, such as by cutting with a suitable blade. In an especially preferred embodiment, a printing machine may be employed that has multiple substantially independent printing stations. An example is the Comco Commander™ from Comco International, (Milford, Ohio). With such machines an entire circuit, including circuit traces and many different electronic components, can be printed on a continuous substrate such as a polymer sheet. In such a system, different solutions of material may advantageously be deposited at different stations, in a manner analogous to depositing different colors in a multicolor printing process. Alternatively, a given station may have multiple deposition jets or other deposition devices for printing a plurality of different solutions.

It is contemplated that both continuous and discontinuous printing may employ any combination of suitable printing technologies, of which inkjet type printing is merely an example. Other contemplated methods, some of which may overlap with one another, are thread dispensing; spraying; stamping; all types of lithography or wet offset; dry offset or letterset; roller printing; letter press printing; gravure printing; screen printing; flexographic printing; planographic printing; offset printing; mimeo graphic printing; thermography; hot stamping and transfer printing techniques; as well as brushing and stenciling techniques. In short, any printing process that uses inks can be employed effectively with embodiments of the present teachings.

In general, the information displays contemplated herein may have a display area in excess of 400 in$^2$, 900 in$^2$, 1600 in$^2$, or even 8000 in$^2$, with pixels in such displays ranging from about 25 $\mu$m to about 500 $\mu$m (125–500$\mu$ pixel sizes). Contemplated displays may advantageously provide an overall thickness of less than about ¼ inch, and more preferably less than about ⅛ inch. These thicknesses are sufficient to permit flexibility of at least 30 degrees along one axis of the display. A production yield of at least approximately 90% is contemplated. Estimated cost of production in $\leq$ \$1.00 per square in at high volume production.

It is also contemplated that using the methods described herein to "print" displays onto flexible supporting materials will allow a "flexible screen" to be produced. As contemplated herein a "flexible screen" is one that can be flexed so that at least a portion of the display area can have a radius of curvature that varies by plus or minus 10°, more preferably 20°, and still more preferably 30°.

It is also contemplated that the methods described herein, because of improvements in the resulting components and the lack of size limitations in the production process, can be used to produce large displays having display areas in excess of 24"×24", 40"×40", or even 48"×60".

In yet another aspect of the inventive subject matter, it is contemplated that displays employing one or more of the novel concepts described herein may advantageously provide increased reliability due to built-in pixel redundancy. Such redundancy permits continued use of the display even where many of the pixels are non- or sub-functional.

Thus, specific embodiments and applications of displays and methods for producing conservatively printed displays have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising", should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of printing an information display, comprising:

provicing a plurality of electrical conductors in the form of a grid having a plurality of nodes;

providing an addressable display element at one of the nodes;

conservatively printing at least one of a switch and a movable light modulation element included in the display element, including the steps of:
 a) depositing a precursor onto a substrate in a desired pattern;
 b) contacting the precursor with a ligand;
 c) applying sufficient energy from an extended radiation source to transfer electrons from the ligand to the precursor, thereby decomposing the precursor to form a patterned conductive precipitate in the desired pattern and thus forming a conductive pattern coating directly on the substrate; and addressing the node using the switch.

2. The method of claim 1 wherein the switch comprises a transistor.

3. The method of claim 1 wherein the switch comprises a transistor and a capacitor.

4. The method of claim 1 wherein the switch comprises a memory element.

5. The method of claim 1 wherein the step of providing the conductors comprises conservatively printing the conductors on a substrate.

6. The method of claim 1 wherein the step of providing a display element comprises conservatively printing the display element on a substrate.

7. The method of claim 1 wherein the step of providing the conductors comprises conservatively printing the conductors on a substrate, and the step of providing a display element comprises conservatively printing the display element on a substrate.

8. The method of claim 1 wherein the display element comprises a conservatively printed moving actuator.

9. The method of claim 8 wherein the moving actuator comprises an ionomeric polymer.

10. The method of claim 9 wherein the moving actuator comprises a mirror.

11. The method of claim 1 wherein the grid spans at least one meter by one meter.

12. The method of claim 11 wherein the display bends at least 30 degrees.

13. The method of claim 1 wherein the switch comprises at least one of a transistor, a capacitor, and a memory element.

14. The method of claim 1 wherein the step of providing a display element comprises conservatively printing at least a portion of the display element on a substrate.

15. The method of claim 1 wherein the step of providing a display element comprises conservatively printing a moving actuator.

16. The method of claim 1 wherein the step of providing a display element comprises conservatively printing an ionomeric polymer.

* * * * *